United States Patent [19]
Irven et al.

[11] 4,087,266
[45] May 2, 1978

[54] OPTICAL FIBRE MANUFACTURE

[75] Inventors: John Irven, Harlow; Andrew Peter Harrison, Stansted, both of England

[73] Assignee: International Standard Electric Corporation, New York, N.Y.

[21] Appl. No.: 784,204

[22] Filed: Apr. 4, 1977

[30] Foreign Application Priority Data

Apr. 6, 1976 United Kingdom ............... 13866/76

[51] Int. Cl.² ...................... C03C 25/02; C03B 37/04
[52] U.S. Cl. ............................................ 65/2; 65/3 A; 65/13; 65/29; 65/DIG. 7
[58] Field of Search ...................... 65/3 A, 13, 18, 29, 65/2, DIG. 7

[56] References Cited

U.S. PATENT DOCUMENTS

| 3,961,926 | 6/1976 | Asam | 65/3 A |
| 3,980,459 | 9/1976 | Li | 65/3 A X |
| 4,009,014 | 2/1977 | Black et al. | 65/3 A |

Primary Examiner—Robert L. Lindsay, Jr.
Attorney, Agent, or Firm—John T. O'Halloran; Thomas M. Marshall

[57] ABSTRACT

A method is described of increasing the proportion of chemical vapor reaction deposited material to substrate material in a silica optical fiber preform. The deposited material is deposited upon the bore of a silica substrate tube whose bore is then collapsed to form the preform. The preform is then heated to cause some of the surface of the preform to be driven off by volatilization in order to increase the proportion of chemical vapor reaction deposited material to substrate material up to a predetermined value.

11 Claims, 3 Drawing Figures

OPTICAL FIBRE MANUFACTURE

BACKGROUND OF THE INVENTION

1. Field of the Invention

This invention relates to silica optical fiber preform manufacture.

2. Prior Art

A method of optical fiber manufacture by a process involving the use of a chemical vapor reaction to deposit material upon the bore of a silica tube, the collapsing of the bore of the coated tube to form an optical fiber preform, and subsequently the drawing of optical fiber from the preform is described for instance in a paper by P.W Black and J. Irvent entitled 'Development of High Silica Optical Fibre Waveguide' appearing in the Proceedings of the Electro-Optics Conference of March 1974 at Brighton, and also in a paper by P.W. Black entitled 'Fabrication of Optical Fiber Waveguides' appearing in 'Electrical Communication' Volume 51 No. 1 (1976). Particularly in the production of large core high numerical aperture fiber by this method, difficulties are liable to be encountered on account of differences in thermal expansion between component parts of the coated substrate. In general dopants such as phosphorus used to modify the refractive index of silica modify also the thermal expansion coefficient of the doped material. This mismatch is liable to cause the deposited material to become detached from the bore of tube if certain criteria of doping concentration and thickness of deposit are exceeded. This limits the numerical aperture and core size that can be obtained by this dopant material in fiber of given diameter produced from substrate tubing of a given diameter and wall thickness. For a particular doping concentration there is a limiting thickness that can be safely deposited on the bore of the substrate tube. A greater doping concentration has a smaller limiting thickness. Thus, for a specified substrate tube, a given doping concentration, and hence a given numerical aperture, determines the maximum ratio of deposited material to substrate material in the completed fiber. There is also a problem of dimensional control that is encountered when the deposition is made onto the bore of tube whose internal and external diameters are liable to vary significantly from piece to piece. If identical deposition conditions are employed to form deposits on tubes of different sizes, then, in the completed fibers, either the overall fiber diameters can be matched, or the diameters of their deposited waveguide portions, but not both simultaneously. This presents considerable problems in making certain types of optically efficient simple permanent or demountable butt couplings between pairs of fibers. It is possible to measure the dimensions of a tube before commencing the deposition process and then to tailor the deposition conditions appropriately. In the case of simple step index fiber this may not involve too much difficulty, but clearly more work is involved in making the necessary computations for making suitable adjustments in the manufacture of graded index fiber whose refractive index grading is required to obey some particular specified power law. A similar situation exists in the case of manufacture of other complex forms of fibre waveguide, such as the W-guide.

SUMMARY OF THE INVENTION

It is therefore an object of the invention to enable the construction of larger cored high numerical aperture fibers. A further object of the invention is to enable the same deposition process to be applied to tubes of slightly different dimensions and then to process the resulting preforms in order to provide each preform with the same core to overall diameter ratio. In each instance this is capable of being achieved by heating the rod preform produced by collapse of the bore of the coated tube so as to cause material to be lost from surface of the rod by volatilisation until the proportion of chemical vapour reaction deposited material to substrate material is brought up to a predetermined value.

DESCRIPTION OF PREFERRED EMBODIMENT

Figure 1:
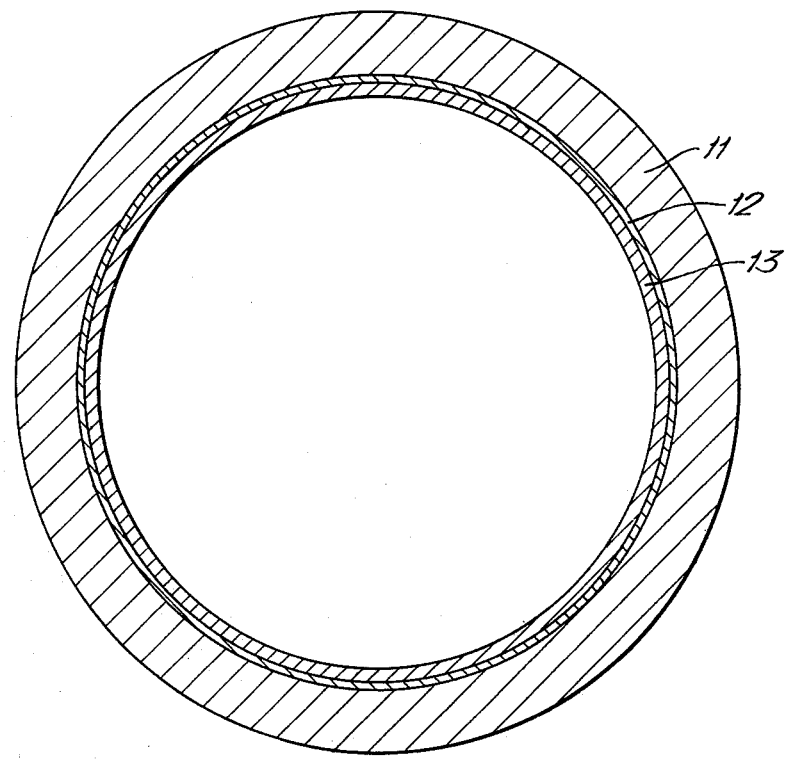
FIG. 1 depicts a cross-section through a length of silica tubing upon whose bore has been deposited material to form the waveguide structure of the completed fiber.
Figure 2:
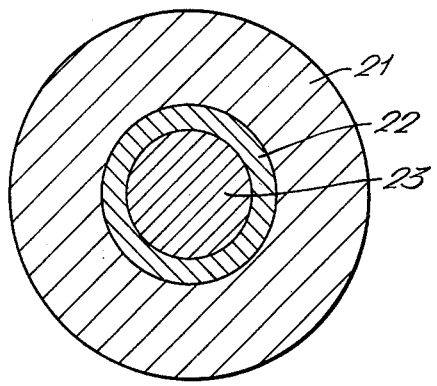
FIG. 2 depicts a cross-section through the coated tube of FIG. 1 once its bore has been collapsed to produce a rod-shaped preform.

A chemical vapor reaction is used to grow a number of layers upon the bore of a silica tube 11. Typically this tube may be 12mm in external diameter and 1mm in wall thickness. A preferred vapor reaction for the deposition process is a halide oxidation reaction from which hydrogen and hydrogen containing compounds are excluded. An advantage of such a reaction is that the exclusion of hydrogen prevents the formation of -OH groups by the reaction, and their incorporation into the deposited material. These are undesirable for many applications on account of absorption bands having tails extending into wavelength regions of interest. The deposited material is principally silica, but part or all of it is suitably doped with other oxides in order to provide the necessary refractive index profile to produce a waveguiding structure.

The halide reagents are entrained in oxygen and are caused to flow through the tube 11 as it is rotated about its axis in a kind of lathe. At the same time an oxyhydrogen flame is slowly traversed along the tube. The vapor reaction is confined to the hot zone provided by the flame, and hence in a single traverse of the flame a thin layer of uniform thickness is built up upon the bore of the tube. The deposition conditions may be such that the deposit is formed as a particulate soot, but it is generally preferred to arrange the conditions so that the deposit forms as a vitreous layer in the first instance. A number of traverses are normally required to build up a sufficient depth of deposit. When the deposit is formed as a soot, the soot may be sintered to vitrify it between each traverse, or a number of traverses may be made before a sintering operation is performed.

In the manufacture of a graded index fiber preform we prefer to space the graded index material from the material of the tube 1 by a layer 12 of constant index material. The material of this layer may be pure silica, but it is preferred to co-deposit silica with a small proportion of a dopant in order to reduce the temperature needed to form a vitreous deposit in the first instance. Typically a sufficient thickness is built up with only two or three traverses. Boric oxide is a preferred dopant for layer 12 as this lowers the refractive index rather than increasing it.

When layer 12 has been deposited, it is covered by the building up of a layer 13 of radially graded index material. Typically about 20 traverses are required to build up a sufficient thickness, and the proportions of the reagent vapors are progressively changed between each traverse. In a preferred construction germania is used as the dopant providing the refractive index grading. The boric oxide concentration may be maintained constant throughout both layers 12 and 13. The germania doping may be graded together with another dopant such as phosphorus pentoxide. Alternatively another dopant such as phosphorus pentoxide, may be used in place of germania.

When the deposition has been completed the tube is again rotated about its axis while being traversed with a flame, but in this instance the temperature is higher, and is sufficiently high to cause the bore of the coated tube to collapse under the influence of surface tension so that a rod is formed. The central portion 23 of this rod is formed by the deposited material of layer 13. This is surrounded by a layer 22 formed of the deposited material of layer 12 which in its turn is surrounded by a layer 21 formed of the substrate material of the tube 11.

During this collapsing process the temperature of the surface of the tube is hot enough for there to be a small but significant loss of material by volatilisation. It is thought that the volatilisation is indirect and involves the conversion of silica into silicon monoxide accompanied by the liberation of oxygen, and that the monoxide, thus, formed, is driven off in vapor form. The loss of material is continued if the flame is then traversed one or more times along the rod while it continues to be rotated about its axis. The rate of loss of material from the rod has been found to be substantially constant while an 80 gram rod was reduced to 60 grams. The rate of loss from the tube as it is collapsed into the rod has been found to be slightly greater, and this has been attributed to the greater surface area of the tube. With a flame heating a 6.5 mm rod to a surface temperature in the range of 2100° - 2200° C, as measured with an infrared pyrometer, the loss of weight was found to be of the order of 10 grams per hour.

Therefore, in the manufacture of a fiber to have a specified core and overall size, the deposition conditions for vapor reaction are chosen so that even with the least favourable dimensions of substrate tubing the ratio of the vapor deposited material to substrate material is always less than that required to meet the given fibre specification. Then, when the coated tube is collapsed into rod, the excess substrate material is removed by volatilisation to bring the preform within the specification.

The removal of the excess substrate material is achieved empirically. To this end the rate of volatilisation under certain specific conditions is determined on trial pieces of silica rod of appropriate diameter. Then the ratio of vapor deposited material to substrate material of the rod fibre preform is measured. This may be determined by visual inspection, either of a flat prepared end of the preform, or of a flat prepared end of a piece of fiber pulled from a short length of the preform. The latter may be preferred since it is relatively easy to prepare a flat end on a piece of fiber by the expedient of scoring and breaking by the application of tension. Then the requisite duration of the volatilisation treatment is calculated directly from a knowledge of the amount required to be removed and the rate at which it is removed as determined by the measurements on the trial pieces of silica.

Figure 3:
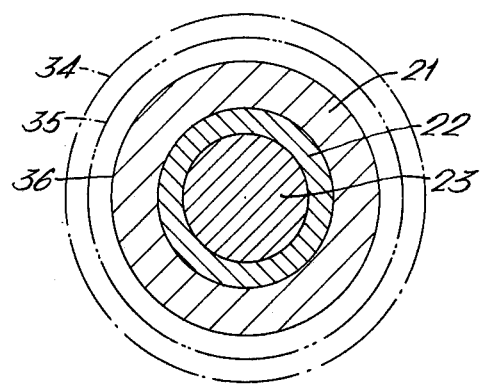
FIG. 3 depicts a cross-section through the preform of FIG. 2 once sufficient material has been volatilised from its surface to bring the ratio of its waveguide structure diameter to overall diameter up to a predetermined value.

For instance a fiber preform was prepared and a short length of fiber was pulled for microscopic examination. The core diameter was measured as $26.6\mu$ in an overall fiber diameter of $100\mu$. The fiber was to meet a specification calling for a core diameter of $30 \pm 0.5\ \mu$. in $100\mu$. Measurements on silica rods of comparable diameter indicated that sufficient material would be removed by two traverses of the flame at a rate of 75 cm per hour. The initial diameter of the preform was 6.7 mm as shown by the broken line 34 in FIG. 3. After one traverse of the flame this was reduced to 6.2 mm and after the second to 6.0 mm as shown respectively by the broken lines 35 and 36. After the first traverse of the flame a second piece of fiber was pulled from a short length of the preform, and a portion having an external diameter of $100\mu$ was examined and found to have a core diameter of $28.7\mu$. After a second traverse of the flame a third piece of fiber was pulled and this time a portion of the fiber having an external diameter of $100\mu$ was found to have a core diameter of $29.7\mu$. This was within the required specification.

It is desirable to measure each substrate tube before coating it, so that when a large enough number of preforms to form a statistically significant sample have been made, the calculation of how much material to remove can be determined with reference to the tube and without recourse to making measurements on the preform or fiber pulled from the preform.

A feature of the above described method of removing excess silica is that, compared with the alternative methods of cutting or grinding, it does not involve putting excessive stresses on the rod. This is particularly important when the composition of the rod is such that it is already subject to high internal stress and therefore very prone to shatter if subjected to external shock.

It may be preferred to maintain a slight excess pressure within the bore of the coated tube at least during the initial stages of collapse of its bore. This may be desirable in order to counteract any tendency for the bore to collapse unevenly by tending to flatten the tube rather than retain circular symmetry. Any such tendency will tend to lessen as the bore shrinks and the wall thickness becomes proportionately greater, and hence if the several traverses of the hot zone are used to collapse the bore the excess pressure may be used for the initial traverses but discontinued before the final collapse. During these initial traverses the excess pressure can be maintained by providing a flow of gas down the tube, and in these circumstances the gas flow may incorporate reagents designed to compensate for any loss by volatilisation of the material deposited on the tube by vapor reaction. A method for achieving this maintenance of excess pressure and compensation for volatilisation loss is described in the specification accompanying our Patent Application NO. 12431/77 filed in Great Britain 24 Mar. 1977.

Instead of determining the ratio of the core diameter to the overall diameter by visual inspection of a prepared end of the preform, measurements may be made through the side of the preform.

In the case of measurements made through the side of the preform it will be appreciated that the curved surface constitutes a cylindrical lens whose magnification will need to be taken account of in making the diameter measurements. The magnification factor can be calculated from the refractive indices of the cladding and the substrate and this can also be compared with empirical measurements.

A particular advantage of making measurements through the side is that they can be made during collapse and at the collapse point. In general it has been found that the different emissivities of the different glasses of the preform at the collapse temperature provide a readily observable interface. By incorporating a feed back loop to the traverse speed of the hot zone during collapse it is possible to regulate the traverse speed to give the required constancy of core diameter to overall diameter as part of the collapsing process instead of as a separate process step. It is to be understood that the foregoing description of specific examples of this invention is made by way of example only and is not to be considered as a limitation on its scope.

We claim:

1. A method of optical fiber preform manufacture for use in drawing an optical fiber having a predetermined ratio of core diameter to overall diameter including the steps of:
   coating, by chemical vapor reaction, the bore of a silica substrate tube having a predetermined thickness with one or more core forming layers having a specified thickness to produce a structure which contitutes an optical waveguide preform when said bore has been collapsed having said specified thickness of core material and an excess thickness of said substrate material;
   heating said coated tube and collapsing its bore; and
   removing a predetermined amount of the outer surface portion of said structure by heating it to a temperature at which said predetermined amount of said substrate material is lost by volatilization, thereby increasing the ratio of said vapor reaction deposited core forming material to said substrate material in said fiber preform.

2. A method of preparing an optical fiber for a high numerical aperture optical fiber having a large core to cladding diameter ratio, said method including the steps of:
   coating, by chemical vapor reaction, the bore of a silica substrate tube constituting a cladding layer having a pedetermined thickness with one or more core forming layers to produce a structure which constitutes an optical waveguide preform when its bore is collapsed having a specified thickness of core material and an excess thickness of said cladding material;
   heating the coated tube and collapsing its bore;
   removing a predetermined amount of the outer surface portion of said structure by heating it to a temperature at which said substrate cladding material is lost by volatilization thereby increasing the ratio of said vapor reaction deposited core forming material to said substrate cladding material; and
   drawing said preform into said optical fiber whereby said optical fiber has a predetermined ratio of core to cladding diameter.

3. A method as claimed in claim 2 wherein said structure is collapsed into a rod, and said rod is rotated about its axis during said substrate removal step of heating said rod to a temperature at which said substrate cladding material is removed by volatilization.

4. A method as claimed in claim 3 wherein said heating of said rod utilizes a localized heating means traversed along said rod.

5. A method as claimed in claim 4 wherein said heating of the rod is with an oxyhydrogen flame.

6. A method as claimed in claim 5 wherein during the collapsing step of said tube's bore, said tube is rotated about its axis.

7. A method of optical fiber preform manufacture for use in preparing an optical fiber preform suitable for drawing into an optical fiber having a predetermined ratio of core diameter to overall diameter including the steps of:
   coating, by chemical vapor reaction, the bore of a silica substrate tube having a predetermined thickness with one or more layers of core forming material to produce a structure which constitutes an optical waveguide preform when its bore has been collapsed, said preform having a specified thickness of core material and an excess thickness of said substrate material;
   heating coated tube and collapsing its bore by traversing a localized hot zone along said tube;
   determining the amount of excess of said substrate material in proportion to said core material and the rate which said substrate material is removed by volatilization;
   removing the excess of said substrate material by traversing a localized hot zone along said structure and adjusting the rate of traversing of said hot zone and hence the amount of substrate material loss by volatilization; and
   controlling said adjustment of the rate of traverse of said hot zone by use of a feed-back loop controlled by an error signal derived from measuring the ratio of said core diameter to said preform diameter at the point of collapse of said tube.

8. A method as claimed in claim 7 wherein the tube is rotated about its axis during the collapse of its bore.

9. A method as claimed in claim 7 wherein said heating is with an oxyhydrogen flame.

10. Optical fiber preform made by the method claimed in claim 1.

11. An optical fiber manufactured by the method set forth in claim 2.